(12) United States Patent
Milewski et al.

(10) Patent No.: US 6,501,834 B1
(45) Date of Patent: Dec. 31, 2002

(54) MESSAGE SENDER STATUS MONITOR

(75) Inventors: Allen E. Milewski, Red Bank, NJ (US);
David R. Millen, Boxford, MA (US);
Thomas M. Smith, Plainfield, NJ (US);
David M. Weimer, Aberdeen, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/990,233

(22) Filed: Nov. 21, 2001

(51) Int. Cl.[7] .............................................. H04M 11/00
(52) U.S. Cl. ................. 379/93.24; 379/93.17; 379/88.17; 709/206
(58) Field of Search ..................... 379/93.24, 90.01, 379/88.04, 88.08, 88.09, 88.11, 88.12, 88.13, 88.17, 88.19, 43.17, 93.23; 455/412; 709/206

(56) References Cited

U.S. PATENT DOCUMENTS

| | | |
|---|---|---|
| 5,790,639 A | 8/1998 | Ranalli et al. |
| 5,930,471 A | 7/1999 | Milewski |
| 6,076,093 A * | 6/2000 | Pickering .................... 707/104 |

FOREIGN PATENT DOCUMENTS

JP  02001273237 A  * 10/2001  ........... G06F/13/00

* cited by examiner

*Primary Examiner*—Melur Ramakrishnaiah
(74) *Attorney, Agent, or Firm*—Wendy W. Koba

(57) ABSTRACT

A message sender status monitor is used to determine the communication status of the sender of an electronic message. In the case of email, upon the recipient opening an email, a query is launched to a "status registry" to determine if the sender of the email is currently logged in to the communication network, or if the sender is currently on the telephone, or currently using a cell phone, etc. This status information is then used by the recipient of the email to determine the communication medium used to send a reply to the email sender. For example, if the status information indicates that the message sender is currently logged in to the data network, the recipient can respond using "instant messaging" (considered, therefore, to be a more efficient type of response that merely responding with an email message).

15 Claims, 3 Drawing Sheets

FIG. 2

```
FROM: TOM SMITH <tsmith@network.com>
SUBJECT: PATENT APPLICATION
TO: DAVID JONES <drj@network.com>

DAVE:

I REALLY NEED TO TALK TO YOU ABOUT THIS APPLICATION.  GET BACK TO
ME AS SOON AS YOU CAN.

THANKS,
TOM.
```

INSTANT MESSAGE: | UNAVAILABLE | ~ 30

PHONE: | AVAILABLE | ~ 32

FIG. 3

```
<HTML>
<BODY>
<A HREF="http://some.server.com/reply.cqi?user=029472094&medium=IM">
    <IMG SRC=http://some.server.com/dynamic-image.cgi?user=029472094&medium=IM">
</A>
<BR>
<A
<A HREF="http://some.server.com/reply.cgi?user=029472094&medium=phone">
    <IMG SRC=http://some.server.com/dynamic-image.cgi?user=029472094&medium=phone">
</A>
</BODY>
</HTML>
```

MESSAGE SENDER STATUS MONITOR

TECHNICAL FIELD

The present invention relates to electronic messaging and, more particularly, to a technique for identifying the "communication status" (e.g., "logged on", "voice phone idle/busy", etc.) of a message sender at the time the receiver of the message opens the electronic message.

BACKGROUND OF THE INVENTION

Electronic messaging (including e-mail and voice mail) has recently experienced a surge in popularity and is now commonly employed by both business people and consumers for a wide variety of tasks. Since electronic messaging systems automate the delivery and storage of information, they simplify the task of communication and of keeping track of the communications. Additionally, as the popularity of electronic messaging has grown, so has the number of messages sent and received by its users. The number of messages is expected to increase even more in the future. Moreover, messaging systems have promoted free-form communications by its users. Although the message headers may be somewhat standardized and structured, the body of messages has remained unstructured, left entirely up to the sender of the message.

The recipient of the electronic message is frequently faced with a choice of media to use to respond to the message (if, indeed, there is a need to response to the received message). Oftentimes, the recipient responds by email simply by default if the original message was received by email. In a similar manner, if the electronic message was received in the form of voice mail, a voice call is used to respond. Although these responses may be adequate in most circumstances, there may be occasions where another media choice would be more expedient in communicating between the sender and the recipient.

SUMMARY OF THE INVENTION

The need remaining in the prior art is addressed by the present invention, which relates to electronic messaging and, more particularly, to a technique for identifying the "communication status" (e.g., "logged on", "voice phone idle/busy", etc.) of a message sender at the time the recipient of the message opens the electronic message.

In accordance with the present invention, and in the context of e-mail, a received e-mail message will have embedded within it a "user activity registry" query that will be immediately and automatically launched when the recipient opens the e-mail (as a significant distinction, prior art arrangements require an extra step and opening another window to determine the status of the sending party). The query, which includes the identity of the sending party, will access the registry and determine if the sender is currently "logged in" to the network, currently involved in a voice call, cell phone "idle", etc. In general, the user activity registry will include current status information regarding the various communication systems used by the sender. This information will be sent back to the recipient of the email and can then be used by the recipient to choose the best media to use to respond to the email (if a response is desired).

An advantage of the present invention is that the embedded registry status query is compatible for use with virtually any conventional email client, as along as the email client is capable of rendering HTML (or any other markup language which may be used). In today's environment, therefore, virtually every commercially available email client may incorporate the use of the inventive status registry. In contrast, prior art arrangements for determining the status of other network users required each user to use the same, specially modified, email client.

When used with a voice mail system, the response may be configured using n interactive voice response (IVR) system to return an audible message to the recipient, who can then use DTMF tones or an automatic speech recognition system to configure a reply.

It is an aspect of the present invention that the query will remain embedded within the email and automatically re-launched each time the message is opened, so that updated information regarding the communication status of the sender will be obtained each time the message is read.

Other and further aspects and embodiments of the present invention will become apparent during the course of the following discussion and by reference to the accompanying drawings.

BRIEF DESCRIPTION OF THE DRAWINGS

Referring now to the drawings,

FIG. 2 illustrates an exemplary email message including an attachment depicting the current "communication status" of the sender of the message;

FIG. 3 contains an exemplary HTML attachment that may be embedded in an email and used to automatically launch the status query to the user registry.

DETAILED DESCRIPTION

Figure 1:
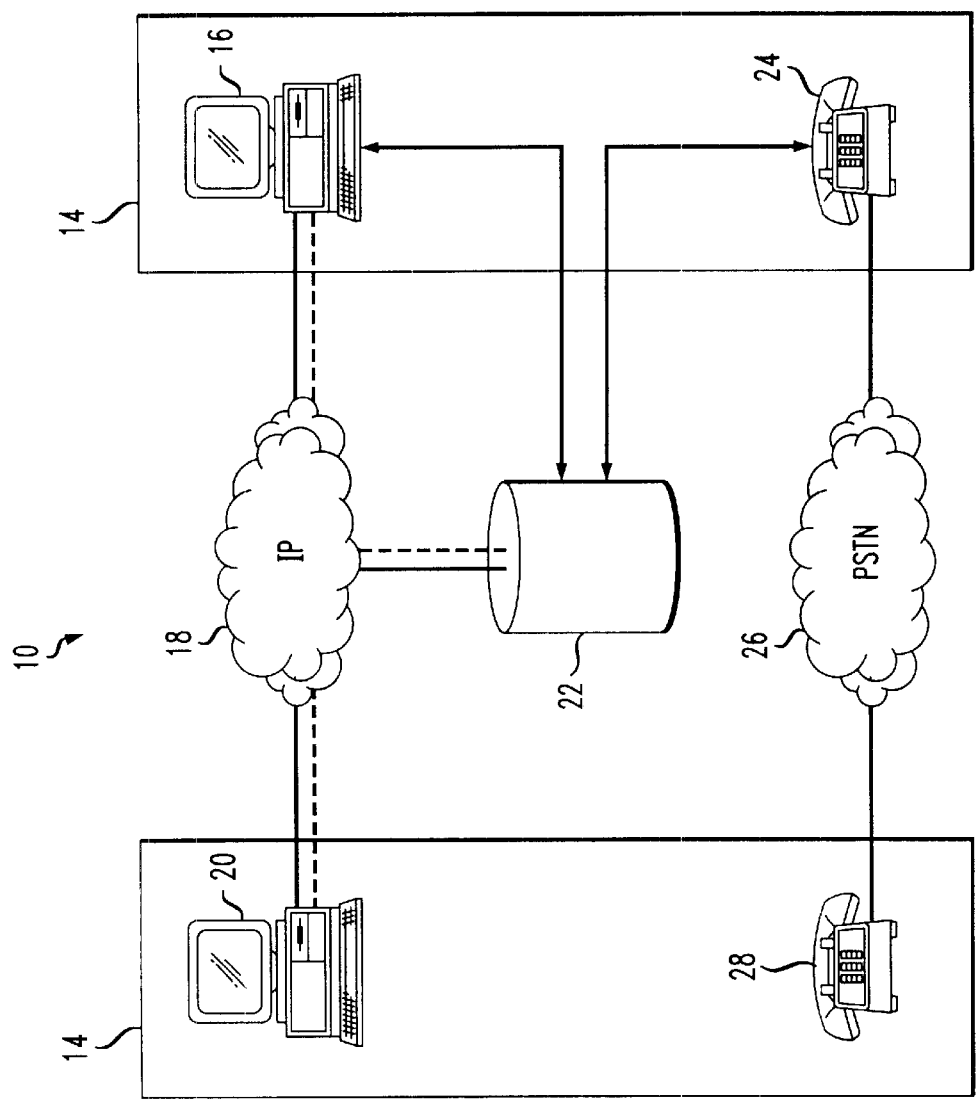
FIG. 1 contains a simplified network diagram illustrating the utilization of the message sender status monitor in accordance with the present invention.

FIG. 1 contains a simplified network diagram 10, illustrating the utilization of the electronic message status monitor to provide for efficient communication between a message sender and a message recipient in accordance with the present invention. In this particular example, a first party 12 (the "sender") has mailed an electronic message (via email, in this example) to a second party 14 (the "recipient"). In particular, sender 12 has used his personal computer 16, coupled to a data network 18, to send a message to personal computer 20 of recipient 14. Embedded within this message, as will be discussed in detail below, is an element that will be activated when recipient 14 opens the mail message to initiate the sender status query. As shown in FIG. 1, a "status indicator" registry 22 is in communication with sender 14 and is updated, at predetermined intervals, to store "activity status" information regarding sender 12. In particular, registry 22 maintains information as to: (1) whether or not sender 12 is currently "logged in" to data network 18 via computer 16, (2) whether or not sender 12 is currently using his voice telephone 24 through PSTN 26, etc. (for example, if sender 12 also has a cell phone or other PDA, status information concerning these devices could also be stored in registry 22).

In accordance with the present invention, when recipient 14 opens the mail message from sender 12, the element will be activated, launching a query to registry 22 through data network 18. The query will recover information regarding the current "communication status" of sender 12, and send that information back to mail recipient 14. FIG. 2 illustrates an exemplary email message incorporating the "communication status" information of sender 12, as sent from registry 22 back to recipient 14, in accordance with the present invention. In this particular example, the status information consists of "instant message" status 30 (i.e., indicating whether or not the sender of the message is "logged in" to the communication network) and "phone" status 32 (i.e., indicating whether or not the sender of the message is using his voice telephone connection). In the particular example illustrated in FIG. 2, message sender 12's "instant message" status 30 is shown as Unavailable (indicating that sender 12 is not currently logged in to data network 18), and message sender 12's "phone" status 32 is shown as Available (indicating that sender 12 is not using his telephone, but may have recently used it). Thus, recipient 14 of this email message can choose to respond to via a telephone call from his telephone 28 to sender 12's telephone 24 through PSTN 26, since recipient 14 knows that sender 12 is not currently on the telephone. In contrast, if "instant message" status 30 had been designated as Available, recipient 14 would have known that sender 12 is currently logged in to data network 18 and could respond, in real time, by instant messaging sender 12. It is to be understood that the use of the status registry in accordance with the present invention does not "upset" the conventional method of sending a response via email to sender 12; that possibility also exists for recipient 14. Moreover, as mentioned above, the status registry of the present invention can be used with virtually any commercially available email client—a particular email client does not need to be shared among the individuals using the system.

FIG. 3 illustrates one exemplary implementation of the element (for example, an applet) utilized to provide the automated query for the message sender's "communication status". In particular, one realization of the communication status monitor is via email that consists of HTML, either in part or as a whole. That is, an email user agent that is HTML-capable (e.g., Netscape Mail, Microsoft Outlook, Eudora, etc.) will render a message only when it is read by the recipient. Using the capability, therefore, an HTML-embedded feature in the sender's email will result in dynamically rendering the associated portion of the message only when it is read, rather than when it was sent. Other than HTML, attachments in the form of XML, VoiceXML and the like may be used.

For example, the HTML (or other appropriate) attachment as shown in FIG. 3 may include a reference to an image located on a WWW server. The image is not sent with the message, but rather requested by the mail client when the recipient selects the message for reading. Instead of a conventional "static" image, moreover, the WWW server may present a dynamic image, based on current conditions. In the exemplary HTML attachment illustrated in FIG. 3, the lines with the <IMG> tags refer to images that are dynamically generated based on the availability of a specified user via a specified medium—at the time the message is read by the recipient. The images can be generated in such a way that the mail clients will not cache them; therefore, if the message is re-read at a later time, the images may be rendered differently if the sender's availability has changed. As a further advantage of the monitor status of the present invention, the images, for example, the Unavailable/Available button 30 associated with "instant messaging" may be hyperlinked to a program that will facilitate the initiation of the instant messaging program between the recipient and the sender.

Figure 4:
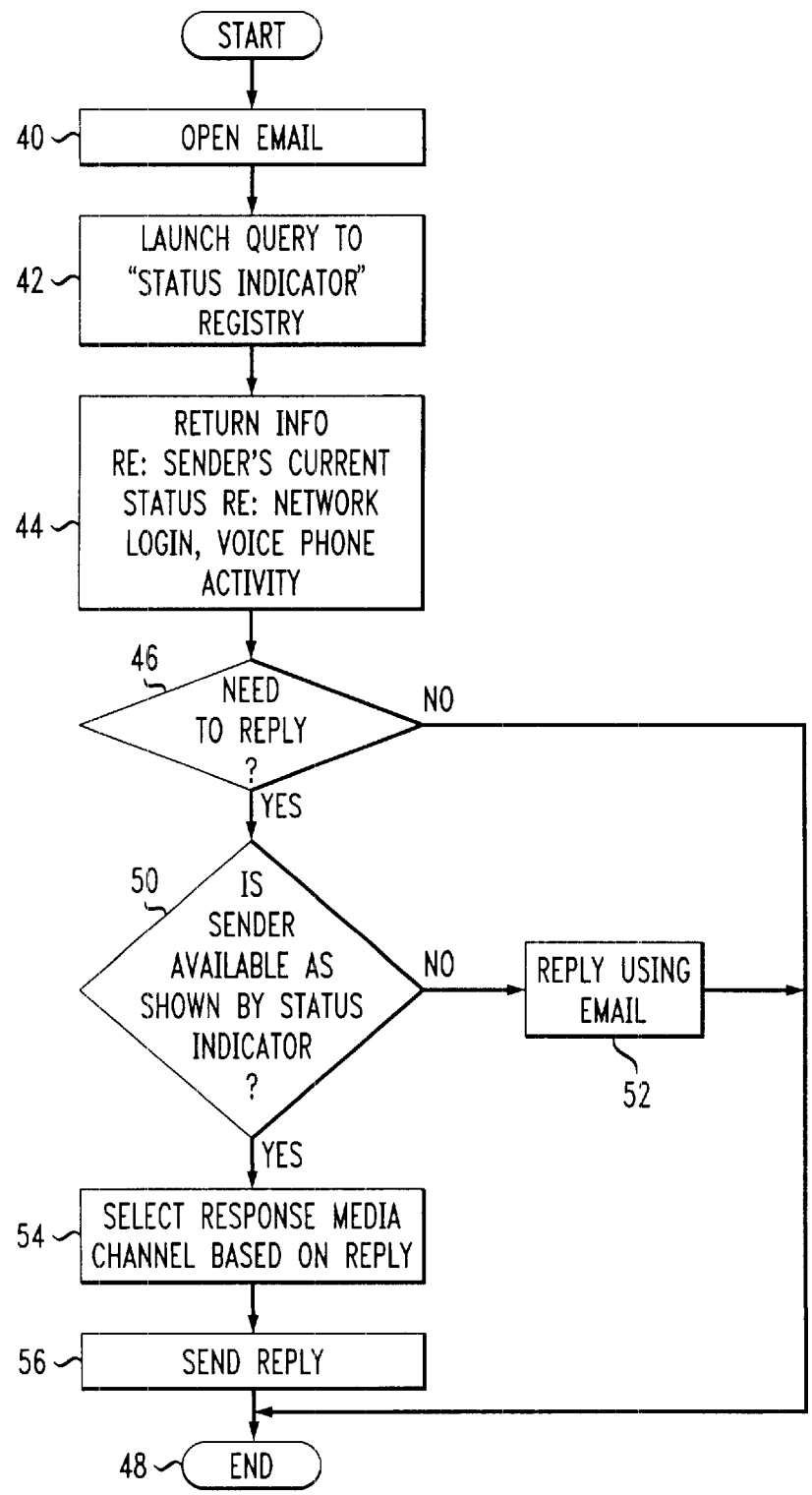
FIG. 4 contains a flowchart illustrating one exemplary process for implementing the user query status in accordance with the present invention.

An exemplary flow chart summarizing the status monitor technique of the present invention is illustrated in FIG. 4. Not particularly identified in this flowchart is the constant updating that occurs (in background mode) between status registry 22 and the various users of the service. It is presumed for the sake of this discussion that registry 22 is updated in a regular fashion and maintains current information regarding the "communication status" of various electronic message senders. Referring to FIG. 4, the process begins when a message recipient opens an email message (block 40). It is to be understood that a similar process can be used with voice mail, where the process is initiated when the recipient first plays back a voice mail message from his mailbox.

Referring now in particular to an arrangement using email, upon opening an email message, an HTML (or similar) attachment in the message (one example being that of FIG. 3) will result in launching a query to status registry 22 (block 42). Registry 22 will retrieve the current status information associated with the sender of that particular message and formulate a reply to be sent to the inquiring recipient (block 44). In the case of email, the reply may take the form of the display as shown in FIG. 2. At this point, the recipient of the message makes a determination regarding the need to response to the electronic message (block 46). If no response is required, the program merely ends (block 48). Alternatively, if the recipient desires to respond to the message, he can check the sender's status (block 50) by observing the "available/unavailable" indications in the "communication status" reply message. If the sender is "unavailable" with respect to each listed medium, the recipient may then choose to conventionally respond via email (block 52) and the program will end. However, if one of the sender's media of communication is "available", the recipient can then select that medium (block 54) and send a reply (block 56). Once the reply is sent, the program will end (block 48).

While the present invention has been described in a preferred embodiment, various modifications may be made without departing from the spirit and scope of the invention. For example, various other communication media (pagers, cell phones, PDAs, etc.) may all be linked through the status registry and any "available" device may be used to response to an electronic message in accordance with the present invention. It is to be further understood that the term "electronic message" is intended to encompass voice mail messages, collected by a recipient using a mailbox coupled to a conventional telephone, as well as email messages accessed through a computer.

What is claimed is:

1. In a communication network for providing electronic messages to be transmitted from a sender to a recipient, a messaging arrangement including
   a status registry for storing current communication status information associated with each user of electronic messaging, where each electronic message includes an embedded program that is activated when the message is retrieved, the program for querying the status registry and obtaining current communication status information of the message sender and providing the query results to the electronic message recipient.

2. The communication network as defined in claim 1 wherein the network further comprises communication links between each user of electronic messaging and the status registry to convey updated status information from each user to said status registry.

3. The communication network as defined in claim 2 wherein updated status information is transmitted each time a user enters or exists one of the communication media types monitored by said status registry.

4. The communication network as defined in claim 1 wherein the communication status information includes information related to whether or not a user is logged in to a data network and whether or not a user is available over a conventional telephone connection.

5. The communication network as defined in claim 1 wherein the electronic message comprises email messages sent to a computer and the program comprises an attachment to an email message.

6. The communication network as defined in claim 5 wherein the attachment comprises an HTML attachment.

7. The communication network as defined in claim 5 wherein the attachment comprises an XML attachment.

8. The communication network as defined in claim 1 wherein the electronic message comprises voice mail messages retrieved by a telephone connection.

9. A method of obtaining real-time communication status information related to a sender of an electronic message, the method comprising the steps of:

providing a status registry in a communication network, the status registry including current communication status information associated with each user of electronic messaging;

upon a recipient opening an electronic message, said electronic message activating a program to query said status registry and return to said recipient current communication status information related to the sender of the electronic message; and responding to said electronic message through a medium as determined by the received communication status information.

10. The method as defined in claim 9 wherein in providing the status registry, said status registry stores information including whether or not each user is logged in to the data network and whether or not each user is available over a conventional telephone line connection.

11. The method as defined in claim 9 wherein the method further comprises the step of each user updating the status registry each time said user either enters or exits each communication medium type maintained in said status registry.

12. The method as defined in claim 9 wherein the electronic messages comprise email messages and the activating program comprises an attachment to each email message, the attachment activating the query to be launched to the status registry.

13. The method as defined in claim 12 wherein the launching attachment is an HTML attachment.

14. The method as defined in claim 12 wherein the launching attachment is an XML attachment.

15. The method as defined in claim 9 wherein the electronic messages comprise voice mail messages and the activating program comprises a local software program for activating the query to be launched to the status registry.

* * * * *